A. E. BOURCOUD.
METHOD OF AND APPARATUS FOR REDUCING METALLIC OXIDS.
APPLICATION FILED JUNE 17, 1918.
1,344,977.
Patented June 29, 1920.
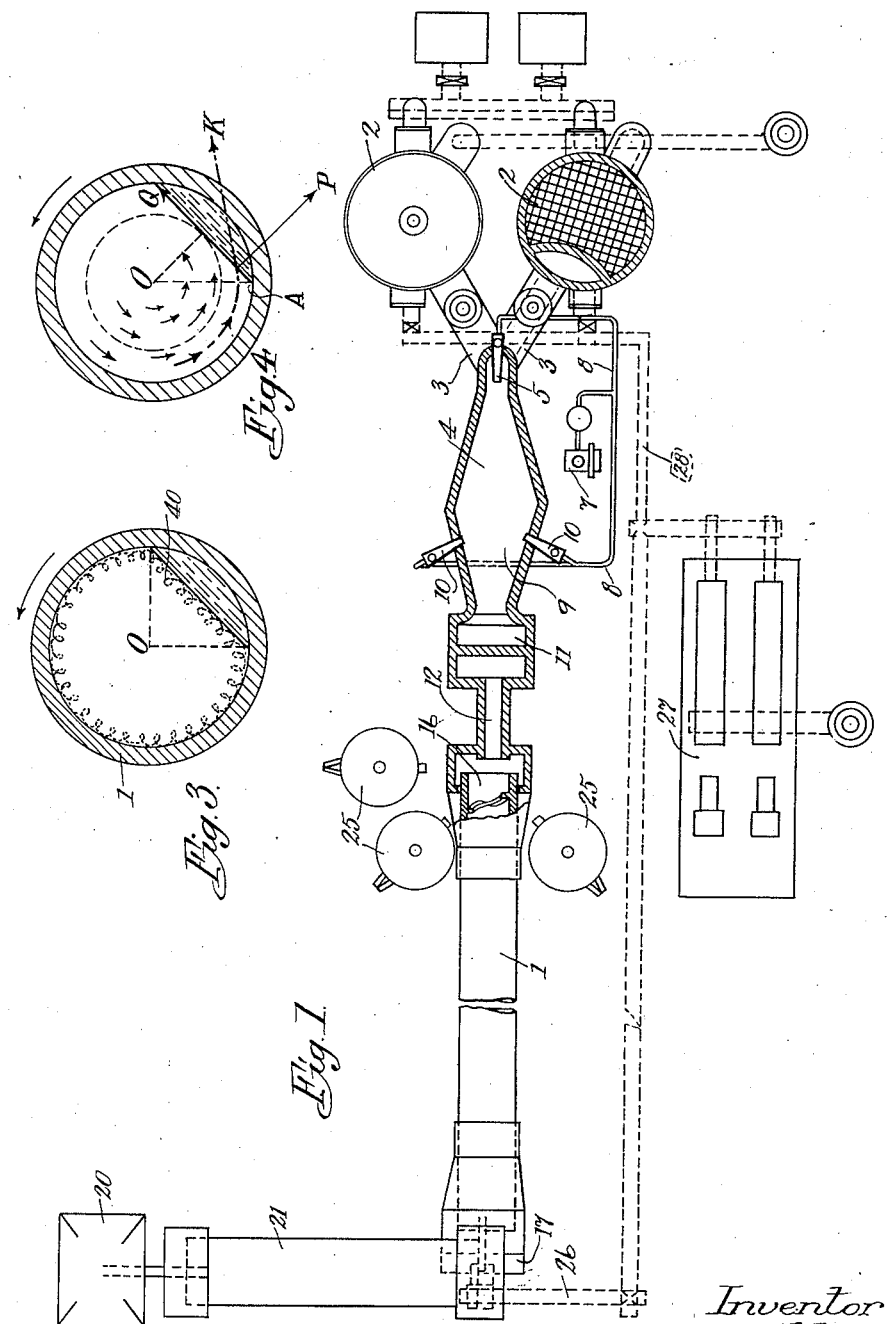
Inventor:
Agustin E. Bourcoud
by Bingley
Attorney A. E. BOURCOUD.
METHOD OF AND APPARATUS FOR REDUCING METALLIC OXIDS.
APPLICATION FILED JUNE 17, 1918.
1,344,977.
Patented June 29, 1920.
2 SHEETS—SHEET 2.
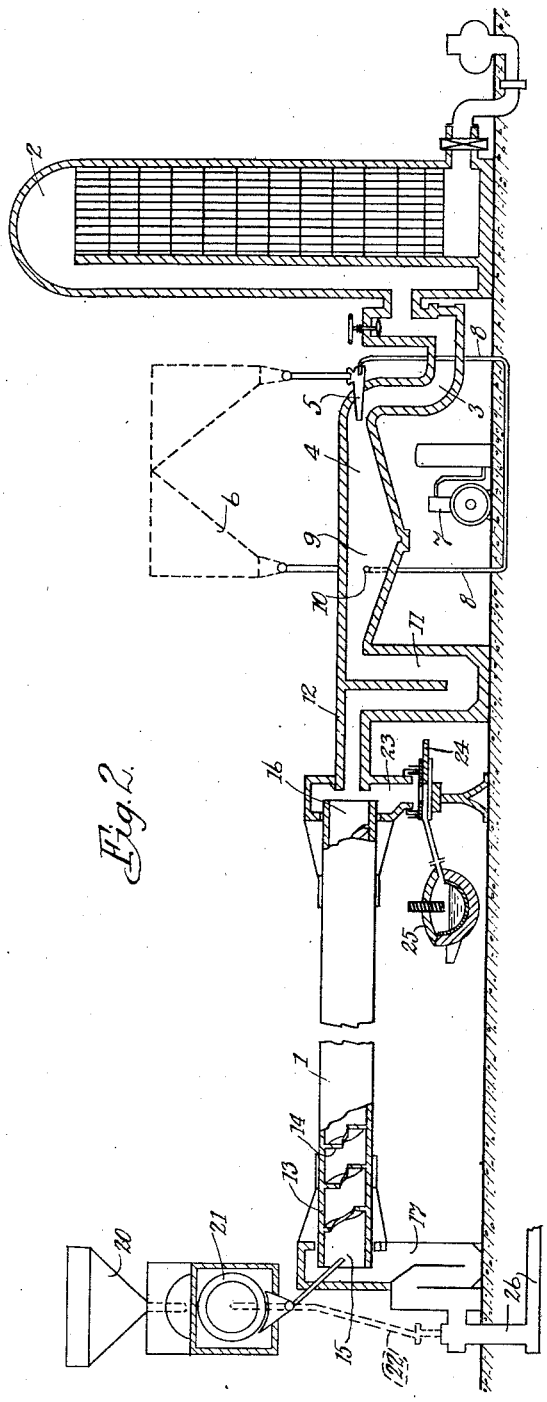
Inventor:
Agustin E. Bourcoud
by Bingley
Attorney

UNITED STATES PATENT OFFICE.

AGUSTIN E. BOURCOUD, OF CHICAGO, ILLINOIS.

METHOD OF AND APPARATUS FOR REDUCING METALLIC OXIDS.

1,344,977.   Specification of Letters Patent.   Patented June 29, 1920.

Application filed June 17, 1918. Serial No. 240,469.

*To all whom it may concern:*

Be it known that I, AGUSTIN E. BOURCOUD, a subject of the King of Spain, of 4570 Lake Park avenue, Chicago, in the county of Cook and State of Illinois, have invented new and useful Improvements in Methods of and Apparatus for Reducing Metallic Oxids, of which the following is a specification.
This invention relates to a method of reducing metallic oxids, and to an apparatus for carrying out this method. While in the following specification reference is made mainly to the reduction of iron ores, it is to be understood that the method and the apparatus can be applied to the treatment of other metallic oxids.

An object of the invention is the creation of a reducing process in which the reducing gases act directly upon the charge of metallic oxids, and in which the thermal energy of the reducing gases, after their reaction upon the charge, is utilized for other purposes, the reducing gases not being returned to the charge. The process, therefore, is not a closed cyclic process, but it is an open cyclic process.

An object of the invention is to generate, in an economical and practical way, a reducing gas of great purity and of suitable temperature for the purpose of reaction. It is furthermore an object of the invention to use low-grade fuel for the generation of these reducing gases, and to produce, in spite of this low-grade starting product, reducing gases of great purity, and to convey these reducing gases, immediately after their production, to the reducing zone while they are still at the high temperature at which they were produced.

Another object of the invention is to generate these reducing gases by the combustion of fuel under forcible addition of air and by causing a reaction between the products of combustion with the rest of the fuel at very high temperature so as to decompose the said products of combustion into combustible gases.

Another object of the invention is to apply a current of reducing gases to the treatment of ores in such manner that a complete reduction of the entire charge of metallic oxids is obtained with the minimum volume of gases. For the purpose of attaining this object, the reducing gases are continuously agitated while in the zone of reduction, and are forced to impact at an angle to the charge, which is also agitated, whereby the various parts of the charge are successively exposed to the reaction with new parts of the reducing gases.

Another object of the invention is to increase the velocity of reaction to bring the same within the practical limits of the working agencies at the disposal of the operator. Each molecule of gas must be brought into a position in which a reaction between a charge and the molecule can take place while it is traveling through the reducing zone, and in order to increase the velocity of reaction, the dynamic pressure or kinetic energy of the gases is utilized, and the entire mass of gases is caused to impact against the entire mass of the charge. It is therefore an additional object of the invention to agitate the charge to bring the same into the path of the circulating gases and to force thereby the circulating gases to change their direction.

Another object of the invention is to facilitate the reaction by comminuting the charge and by decreasing thereby the size of the single particle upon which the reducing gas is to act. This reduction of the size naturally must not go too far, otherwise the charge will be taken along by the flow of gases and will be carried out of the furnace together with the gases.

It is furthermore an object to produce agitation of the gases not only for the purpose of bringing the gases into actual contact and even impact with the charge, and to utilize the kinetic energy of those molecules of gases which reach the charge, but it is also an object of the invention to agitate the reducing gases for the purpose of continuously changing those layers or zones of gases which are successively brought into reactive contact with the charge. This additional mixture of the reducing gas can be attained by varying the location and the influence of the agitating means at different parts of the furnace upon the gas so as to induce this intimate mixture of the gases.

The invention is illustrated in the accompanying drawing, in which—

Figure 1 is partly a top plan view and partly a sectional view (diagrammatically) of an apparatus for carrying out the method;

Fig. 2 is a side elevation, partly section (also diagrammatically), of the apparatus;

Fig. 3 is a diagrammatical sectional view through a rotary furnace which is not provided with agitating means for the charge and the reducing gases;

Fig. 4 shows a similar diagrammatical sectional view of a rotary furnace provided with agitating means for utilizing the kinetic energy of the reducing gases;

Fig. 5 is a diagrammatical illustration of one form of agitating means illustrating the different action of these agitating means upon the reducing gases in different portions of the reducing zone, and Fig. 6 is a similar sectional diagrammatical view of a modified construction in the furnace.

As will be seen from the drawings, the apparatus includes in combination with the rotary furnace, indicated at 1, a device for producing the reducing gas and a conduit for conveying the reducing gas to the furnace as the main parts of the plant. Air heaters 2, made up of checkerwork in a well-known way, receive a supply of air through any of the well-known positive pressure devices, like a Root blower or the like. These heat exchange and storage devices 2, which, like in other furnace plants, may be used alternately and are heated in any suitable desired way, deliver the hot air through the conduit 3 to a combustion chamber 4. The combustion chamber contains a nozzle 5, projecting through the wall of the chamber and communicating with the reservoir 6, of standard construction, in which fuel is stored. If solid fuel is used for generating the reducing gases, this fuel preferably is pulverized so as to leave the nozzle in atomized and finely distributed condition. It is obvious, however, that instead of solid fuel, liquid or gaseous fuel, or a mixture of them, may be utilized for the generation of the reducing gases. The discharge of the fuel in finely divided condition, in the form of a spray from the nozzle, is effected by air, gas, or steam pressure, and for this purpose a compressor 7 is driven by any suitable prime mover, conveying the pressure fluid through the conduit 8 into the interior of the nozzle, where this fluid, by injection effect, discharges the fuel into the interior of the combustion chamber, and, owing to the forcible addition of air from the air heater 2, the entire fuel is immediately completely consumed so as to produce non-combustible products of combustion.

The combustion zone in the combustion chamber 4 is contiguous to a gas generating zone 9, in which the non-combustible products of combustion are decomposed, owing to the intense heat. Atomized fuel in solid form is delivered through several nozzles 10 projecting through the walls confining the generating zone, these nozzles also being in communication with the fuel reservoir 6. In this decomposition of the products of combustion reducing gases are formed at very high temperature, and these reducing gases are conveyed to the interior of the furnace. The exothermic action takes place in the combustion zone, in which the fuel is merely converted into non-combustible products of combustion. The reaction of the carbon or decomposed hydrocarbon emanating from the nozzles 10 of the generating zone upon the products of combustion leads to an endothermic reaction generating combustible gases which may be used for reducing the charges in the rotary furnace. The nozzles 10 in the gas generating zone 9 being disposed angularly with respect to each other and with respect to the nozzle 5 in the combustion zone 4, will cause the production of a thorough mixture of the products of combustion with the fuel, as the entire gaseous mass is thoroughly whirled about so as to convert every molecule of the gaseous products of combustion into reducing gas. The compressor 7, which furnished the air for injecting fuel into the nozzle 5 of the combustion zone, also may be used for injecting air (or another compressed fluid) into the nozzles 10 of the gas generating zone 9 for the purpose of forcing the fuel into the interior of the same.

The nozzle or nozzles 5, and the nozzle or nozzles 10 will in practice be provided with suitable means whereby to regulate at will the quantity of fuel injected by each, in whatever ratio should be desirable, so as to effect the most appropriate gasification of the fuel or fuels used.

The reducing gases are conveyed through the conduit 12, which is provided with a trap 11 for depositing the soot and ashes avoiding their entrance into the rotary furnace 1; the ashes may be removed by any means desired but not shown in the drawings. This furnace is constructed and supported in the manner of the ordinary kilns used at the present time for cement making and metallurgical methods (which furnaces are rotated at any desired rate of speed), and consists of a shell 13 and means in the interior of the same for agitating the charge introduced. These means are shown in the embodiment illustrated as helical ribs 14, projecting from the inner surface of the furnace inwardly and being adapted to impart to the charge not only a rotary movement in contact with the inner wall of the furnace, but to advance the charge, owing to this rotation. The charging opening is indicated at 15, and the discharge opening into which said reducing gases are conveyed at 16. As the gases in their conveyance from the opening 16 adjacent to the conduit 10 toward the charge opening 15 for the metallic oxids also come into contact with the ribs 14 projecting from the shell 13 of the kiln inwardly, it is obvious that they also will be deflected and will be agitated, so that they are not only moved longitudinally toward the discharge end of the furnace (which movement is not due to the mechanical construction of the furnace), but they are whirled or moved in circular direction and thereby agitated together with the charge in the furnace. Owing to this rotary movement of the reducing gases, they are forced to impinge under an angle against the charge, and owing to this whirling movement, the kinetic energy imparted to the gases is utilized for action upon all of the particles of ore contained in the charge.

By reference to Fig. 1 it will be noticed that the helical ducts through which the reducing gases are forced to travel, do not have uniform cross-section everywhere. This alteration in the sectional area of the duct through which the gas travels is resorted to for the purpose of increasing the agitation of the gases.

The action of the gases upon the charge in an ordinary rotary furnace is illustrated in diagrammatical cross-section of Fig. 3. Assuming that a rotary furnace of about 7 ft. diameter is charged with metallic oxids which occupy an arcuate portion of the furnace of about 90°, that part of the inner furnace wall which is not in contact with the charge is more than three times as large as that part of the furnace wall on which the charge rests. In analyzing the action of the reducing gases in that instance upon the charge, the gases may be compared to a solid block moving axially through the furnace. The molecules move parallel without being much affected by the slow rotary movement of the furnace and the resulting slow sliding action of the surface of the charge. Under these circumstances the only molecules of gas which would affect the charge are those in the zone 40, and in this zone the gas molecules are kept in a continuous whirlwind, in a limited cross-section, owing to the generation of the eddy currents by friction. The balance of the gases (and this is by far the larger part of the same) will not in any way react upon the charge by contact; the action of this larger part of the volume of gas is therefore lost.

Now in the rotary furnace provided with agitating means, either of the character described in the present specification or any other suitable agitating means, the gases not only flow parallel to the axis of the cylinder, but also circulate about this axis. According to Fig. 4, the volume of gases may be compared to a solid cylinder which is not only axially moved through the furnace, but revolves at the same time, so that the line of contact with the charge is actually the entire inner circumference of the furnace corresponding to the outer circumference of the cylindrical block of gases. That area representing the gases which would be in actual contact with the charge is at least equal to the circular crown between the two radii OA and OC, or about 45° of the whole area shown.

This high percentage can be increased still more if the gases, after having been forced to circulate, are caused to enter into a mixture with gases which have not yet given their reductive value to the ore and which thus present with the new mixture a further contact of the 45°. A second mixing of these gases would add another 45% of the rest, so that with three mixing operations of this kind the total utilization of gases would be about 90% of the entire volume.

The reducing gases, after having been reacted upon by the oxygen of the charge in the furnace and having been oxidized without having lost much of their reductive value, are discharged into a flue 17, which also is provided with a trap for collecting material particles which may still be present in the gases. The charge of the furnace is effected from a hopper 20, which communicates with a rotary kiln 21, in which the charge may be preheated so as to eliminate through this preheating operation a large amount of the volatile or oxidizable impurities in the ores. As the reducing gases, after their reaction upon the charge, have been practically exhausted for reductive work, but still contain a latent calorific value of considerable degree, it is obvious that these reducing gases may be utilized for preheating this charge, and for this purpose a flue or conduit 22 extends from the conduit 17 to the preheating kiln 21, in which the charge is prepared for reduction. The metal withdrawn from the furnace 1 at the discharge end 16 through the rotary action of the furnace, drops into the spout 23, from which it may be forced by a hydraulic ram 24 or the like into a crucible or electric furnace 25, to be subjected to melting and final refinement through the heat of the electric furnace. It is obvious that a number of these electric furnaces 25 may be held ready to be filled by the charge expelled from the furnace, and that instead of an electric furnace a gas-tight container to receive the reduced oxid metal may be provided in accordance with the requirement of the particular case.

Part of the off-gases, which, through their reaction with the metallic oxids, have changed their composition, are conveyed into the flue 26, which may lead to a power house, indicated at 27, wherein the electric energy for the various furnaces or other requirements for the plant is generated. This power house can be equipped with gas or steam engines to which the off-gases from the furnace may be supplied as fuel in the ordinary way. The remainder of the off-gases is conducted through the pipes or flues 23 into the air heaters 2 for the purpose of facilitating the heating of the air which is burned together with the atomized fuel in the combustion chamber 4 to produce the reducing gases.

The gases, after passage through the air heaters, are not returned to the furnace, to distinguish from closed cycle processes, in which, through suitable reduction of the oxidized reducing gases, the latter are again rendered available for reducing service.

The process which is carried out in the described apparatus is probably apparent from the description given. It is based on an improved method of gasifying atomized fuels through which, instantaneously and directly, a powerful and pure reducing gas is generated. In the ordinary blast furnace of the shaft pattern, charged with compositions of iron ore and supposed to effect the direct reduction of iron ore, the circulation of the gases has never been a uniform circulation, and the reduction, therefore, also was incomplete. The ore was only reduced on the surface, especially if it was charged in large lumps, and the discharge of the reduced metal provided difficulties. In an ordinary rotary furnace, however, the charge, by its continued agitation and contact with continuously altered portions of the wall of the furnace, always will present different parts to the reducing gases flowing through the furnace, but in this movement of the gases only a very small percentage of the molecules are in condition to effect the desired and necessary contact with the charge. As the speed of the reaction is of vital importance, the furnaces would have to have extreme length, if in the flow of the reducing gases through the furnace, all of the particles of the said gases constituting the small percentage which theoretically is possible to be used, would have a chance to come into contact with the charge, not mentioning the fact that their kinetic energy cannot enter into play and its advantages be utilized.

In order to utilize a very large portion of the reducing gases without unduly increasing the length of the furnace, the dynamic pressure or kinetic energy of the gases is taken into consideration. This factor is of the greatest value, and may not be inferior in importance to the other factors which determine the efficiency of the reduction; namely, the purity of the reducing gases and their temperature. As the entire mass of gases is brought into impact with the charge to be produced, the gases enter into the mass and filter into the several pieces of ore under treatment. This law of penetration is well-known in metallurgical operations. The mass action multiplied by the time of contact constitutes the metallurgical momentum. For the carrying out of a certain reaction, the increase of one of these factors may be accompanied by a decrease of the other, and vice versa. For a complete reduction it is necessary that the reducing gases reach the very core of every lump or grain of ore, and this naturally requires that the gases may be circulated freely through the furnace.

The charge, therefore, must be introduced in more or less comminuted condition, say, for instance, pea size or smaller. It must flow under agitation through the reducing zone so as to cause a return of hot reducing gases to flow over the moving charge. The contact of this reducing gas with the charge must not be a mere tangential contact, but the gases must be principally forced to impact the charge under an angle to take advantage of the kinetic energy of the moving gas. It is furthermore necessary to intermix the reducing gases in one or several zones of the furnace for the purpose of providing opportunity for every molecule of gas to effect a material contact with the charge under the advantageous conditions stated. Fig. 4 illustrates diagrammatically that a relatively large percentage of the circulating reducing gas is forced into impact with the moving charge, and that a relatively high proportion, represented by the component P, of the kinetic energy as illustrated at K, is directed normal to the charge, while the other component Q is directed parallel to the surface of the charge. This agitation of the charge as well as of the reducing gases is effected in the present process by the spiral rib in the interior of the furnace. The effect of causing the molecules of gas to mix after use with molecules of gas which have not been used, can be attained by altering, in different portions of the furnace, the pitch or height of thread of the helical rib. Fig. 5 illustrates diagrammatically a helical wall of this character, in which, for instance, the portion indicated at M may be that zone in which the mixture of the molecules of gases occurs more strongly than in the portions N, which are devoted to the normal reaction of the reducing gases on the charge.

The diagrammatic longitudinal section of Fig. 6 shows a rotary furnace in which through projections B, extending in alternation from opposite sides of the furnace inwardly, the gases are forced to travel in a zigzag path Z so as to impact upon the charge and to spend their kinetic energy to a large extent.

The temperature of the combustion air entering through the conduit 3 into the combustion chamber 4 can be calculated so as to produce such high combustion temperature as is necessary to provide the total endothermic advantage to counterbalance heat losses, etc., and to maintain a minimum final temperature of between 1000 and 1100° C. This high temperature assures a complete and rapid reaction. The temperature of the reducing gases leaving the furnace at 15 is very little below this temperature at which the gases are conveyed into the furnace at 16. The reducing gases, being therefore extremely hot when entering through 17, are adapted to preheat the charge in the kiln 21, so that the oxids to be reduced are conveyed to the furnace 1 at a temperature of 700 to 750°. This high temperature will prevent, to a large extent, the deposition of carbon in the furnace, and also will have the effect of increasing the length of the active zone in which a suitable high temperature prevails. If the charge would enter the furnace at lower temperature, then the reducing zone at which the necessary temperature actually exists, would naturally be shorter in the furnace 1.

I claim:

1. A method of reducing metallic oxids, consisting first in mixing a non-combustible gas with atomized fuel at high temperature, thereby converting such mixture to a reducing gas, and after such conversion bringing this reducing gas at high pressure into contact with the oxids to be reduced.

2. A method of reducing metallic oxids, consisting first in mixing a non-combustible gas with atomized fuel at high temperature, thereby converting such mixture to a reducing gas, and after such conversion bringing this reducing gas into contact with the oxids to be reduced.

3. A process of reducing metallic oxids, which consists of generating a product of combustion by burning fuel under forcible addition of air, mixing the product of combustion with atomized fuel at a sufficiently high temperature to produce a reducing gas, and passing the reducing gas through the charge of oxids to be reduced.

4. A process of reducing metallic oxids, which consists of generating products of combustion by burning fuel under forcible addition of heated air at a temperature varying with the nature of the fuel used, mixing the products of combustion with atomized fuel at a temperature sufficiently high to produce a reducing gas, and passing the reducing gas at high temperature over the charge of metallic oxids to be reduced.

5. A process of reducing metallic oxids, which consists of generating at high temperature a product of combustion, injecting into the said product of combustion while at high temperature atomized fuel to produce a reducing gas, and passing the reducing gas over and through the charge of metallic oxids to be reduced.

6. A process of reducing metallic oxids, which consists of generating products of combustion at high temperature by burning atomized fuel under the addition of preheated air, injecting fuel at high temperature into said products of combustion to generate reducing gases at high temperature, and passing said reducing gases over the charge to be reduced.

7. A process of reducing metallic oxids, which consists of generating products of combustion at high temperature by burning atomized fuel under addition of air at a temperature varying with the nature of the fuel at a point remote from the oxids used, injecting fuel into the products of combustion while at high temperature to generate reducing gases at high temperature, and passing said reducing gases over the metallic oxids to be reduced.

8. A process of reducing metallic oxids, which consists of generating products of combustion by burning atomized fuel under addition of preheated air, varying the temperature of the heated air in accordance with the nature of the fuel used, injecting atomized fuel at high temperature into said products of combustion to generate reducing gases at high temperature, and passing said reducing gases at high temperature over the metallic oxids to be reduced.

9. A process of reducing metallic oxids, which consists of comminuting the oxids, mixing at a point located outside the reducing zone a product of combustion at high temperature with fuel at high temperature to produce reducing gases, and passing said reducing gases at high temperature over the comminuted metallic oxids.

10. A process of reducing metallic oxids, which consists of generating products of combustion at high temperature, injecting atomized fuel into said products at high temperature to produce reducing gases, passing said reducing gases at high temperature over the metallic oxids, and agitating the metallic oxids during the passage of the reducing gases thereover.

11. A process of reducing metallic oxids, which consists of generating a product of combustion at high temperature, injecting fuel into said product of combustion to produce a reducing gas at high temperature, passing said reducing gas at high temperature over a charge of metallic oxids, and continuously conveying different portions of said charge of metallic oxids in predetermined direction into the zone of influence of said reducing gases.

12. A process of reducing metallic oxids, which consists of generating products of combustion at high temperature, injecting atomized fuel into said products of combustion to produce reducing gases at high temperature, mechanically imparting uniform movement to the entire charge of metallic oxids to be reduced, and passing said reducing gases at high temperature over the moving charge of metallic oxids.

13. A process of reducing metallic oxids, which consists of generating products of combustion, injecting fuel into said products of combustion to produce reducing gases at high temperature, passing the reducing gases at high temperature over a charge of metallic oxids, and forcibly imparting movement in a helical path to said reducing gases and the charge of metallic oxids.

14. A method of reducing metallic oxids, consisting in causing the ore mass to travel at regulated speed and its particles to be agitated and to successively expose new surfaces; and to successively bring reducing gas into forcible impact with such ore surfaces.

15. A method of reducing metallic oxids, consisting in causing the ore mass to travel at regulated speed and its particles to be agitated and thereby successively expose new surfaces, and to also cause reducing gas to be successively deflected and brought into forcible penetrative impact with the ore particles.

16. A method of reducing metallic oxids, consisting in causing a mass of comminuted ore to travel at regulated speed and its particles to be agitated and thereby successively expose new surfaces, and to also cause reducing gas to be brought into forcible impact with the ore particles.

17. In an apparatus for reducing metallic oxids, a furnace, a chamber consisting of a combustion zone and a gas generating zone, an air heating device, means for introducing fuel and hot air into said combustion zone, means for introducing fuel into said gas generating zone, and a conduit for conveying the fuel with the hot products of combustion away from said combustion and gas generating zone to the furnace.

18. In an apparatus for reducing metallic oxids, a rotary furnace, a combustion chamber, an air heater communicating with said chamber, a fuel reservoir, a nozzle communicating with said fuel reservoir and said combustion chamber, a gas generating chamber in communication with said combustion chamber, nozzles communicating with said gas generating chamber and said fuel reservoir, a conduit leading from said gas generating chamber to the rotary furnace, a hopper, and a conduit communicating between said furnace and said hopper.

19. In an apparatus for reducing metallic oxids, means for producing reducing gases, means for heating said reducing gases, a rotary furnace, a conduit for conveying said reducing gases at high temperature to said rotary furnace, and means for agitating simultaneously said reducing gases and a charge of metallic oxids in said furnace.

20. In an apparatus for reducing metallic oxids, a chamber having a combustion zone, a fuel reservoir, a nozzle in said combustion zone communicating with said fuel reservoir, means for introducing fuel under pressure and in atomized condition through said nozzle into the combustion zone, means for introducing preheated air into said combustion zone, said chamber having another zone in communication with said first named chamber, nozzles in said second zone communicating with the fuel reservoir, means for introducing fuel in finely divided condition into said second zone for transforming said products of combustion into reducing gases, a rotary furnace having agitating means in the interior thereof, a conduit communicating between said second zone and said rotary furnace and terminating at one end of said rotary furnace, a hopper containing the metallic oxids to be reduced, and a conduit extending from the other end of said rotary furnace to said hopper.

21. In an apparatus for reducing metallic oxids, a rotary furnace having helical ribs in its interior and extending approximately to the diametric center thereof.

22. In an apparatus for reducing metallic oxids, a rotary furnace having means to cause reducing gas to describe spiral movement through said furnace.

23. In an apparatus for reducing metallic oxids, a rotary furnace having helical ribs in its interior, certain of said ribs extending approximately to the diametric center of the furnace to cause reducing gas to travel in a spiral path through the furnace, certain other of the ribs, at spaced points, being of less width, to effect a stirring and mixing of the reducing gas at such points.

In witness whereof I affix my signature.

AGUSTIN E. BOURCOUD.